US007002601B1

(12) United States Patent
Sherburne

(10) Patent No.: US 7,002,601 B1
(45) Date of Patent: Feb. 21, 2006

(54) METHOD AND APPARATUS FOR RENDERING A QUADRANGLE PRIMITIVE

(75) Inventor: Robert W. Sherburne, Kentfield, CA (US)

(73) Assignee: Microsoft Corporation, Redmond, WA (US)

(\*) Notice: Subject to any disclaimer, the term of this patent is extended or adjusted under 35 U.S.C. 154(b) by 0 days.

(21) Appl. No.: 09/565,562

(22) Filed: May 4, 2000

(51) Int. Cl.
*G09G 5/00* (2006.01)

(52) U.S. Cl. .................. 345/629; 345/630; 345/441; 345/423; 345/581; 345/582; 345/589; 345/592

(58) Field of Classification Search ............... 345/629, 345/630, 423, 581, 582, 589, 592, 441
See application file for complete search history.

(56) References Cited

U.S. PATENT DOCUMENTS

| 4,499,457 A | 2/1985 | Hintze ................... 340/703 |
| 4,970,500 A | 11/1990 | Hintze ................... 340/703 |
| 4,982,178 A | 1/1991 | Hintze ................... 340/703 |
| 5,361,386 A | 11/1994 | Watkins et al. .......... 395/130 |
| 5,579,456 A | 11/1996 | Cosman .................. 395/128 |
| 5,748,867 A | 5/1998 | Cosman et al. .......... 395/130 |
| 6,359,629 B1 \* | 3/2002 | Hopcroft et al. .......... 345/620 |
| 6,362,825 B1 \* | 3/2002 | Johnson .................. 345/522 |

\* cited by examiner

*Primary Examiner*—Kimbinh T. Nguyen
(74) *Attorney, Agent, or Firm*—Woodcock Washburn LLP

(57) ABSTRACT

A method and apparatus thereof for generating a computer graphics image using quadrangle-shaped primitives formed by combining connected triangle-shaped primitives. In a computer graphics rendering process, a first triangle-shaped primitive and a second triangle-shaped primitive that are connected (that is, they share vertices and a side) are optionally combined to form a quadrangle-shaped primitive. When the first and second triangle-shaped primitives are combined, the resultant quadrangle-shaped primitive is forwarded to a quad-based rasterization process (e.g., a rasterizer or rasterizer subsystem). Otherwise, the first triangle-shaped primitive is forwarded to the rasterization process. The second triangle-shaped primitive may also be forwarded to the rasterization process separate from the first, or it may be used to form a quadrangle in combination with another triangle primitive connected to it. A graphics subsystem could effectively double its throughput of connected triangle primitives by going from three vertices and three edges per primitive to four vertices and four edges per primitive.

23 Claims, 5 Drawing Sheets

METHOD AND APPARATUS FOR RENDERING A QUADRANGLE PRIMITIVE

TECHNICAL FIELD

The present invention pertains to the field of computer processing, in particular three-dimensional graphics geometry processing. Specifically, the present invention pertains to a method and apparatus for rendering triangle primitives as quadrangles.

BACKGROUND ART

Computer graphics design generally consists of instructions implemented via a graphics program on a computer system. The instructions are used to specify the calculations and operations needed to produce three-dimensional displays. OpenGL by Silicon Graphics, Inc., of Mountain View, Calif., exemplifies a system of graphics instructions used by graphics designers and artists.

Computer graphics design can be envisioned as a pipeline through which data pass, where the data are used to define the image to be produced and displayed. At various points along the pipeline, various calculations and operations are specified by the graphics designer, and the data are modified accordingly.

In the initial stages of the pipeline, the desired image is framed using geometric shapes such as lines and polygons, referred to in the art as "primitives." The derivation of the vertices for an image and the manipulation of the vertices to provide animation entail performing numerous geometric calculations in order to project the three-dimensional world being designed to a position in the two-dimensional world of the display screen.

Primitives are then decomposed into "fragments," and these fragments are assigned attributes such as color, perspective, and texture. In order to enhance the quality of the image, effects such as lighting, fog, and shading are added, and anti-aliasing and blending functions are used to give the image a smoother and more realistic appearance. In the final stage, the fragments and their associated attributes are stored in the framebuffer as pixels. The pixel values can be later read from the framebuffer, and can be used to display images on the computer screen.

The processes pertaining to assigning colors, depth, texturing, lighting, etc., are collectively known as rendering. The specific process of determining per-pixel or per-fragment values from input geometric primitives is known as rasterization.

With reference now to Prior Art FIG. 1, process 130 exemplifies one embodiment of a graphics design process implemented using a graphics program on a computer system. Process 130 enables the designer to produce three-dimensional images using different computer systems and processors. Process 130 operates on vertex (or geometric) data 131. The process stages within process 130 consist of display list 133, evaluators 134, per-vertex operations and primitive assembly 135, rasterization 138, per-fragment operations 139, and framebuffer 140.

Vertex data 131 are loaded from the computer system's memory and saved in display list 133; however, in some graphics programs, a display list is not used and, instead, the vertex data are processed immediately. When display list 133 is executed, evaluators 134 derive the coordinates, or vertices, that are used to describe points, lines, polygons, and the like (e.g., primitives). All geometric primitives are eventually described by collections of vertices.

With reference still to Prior Art FIG. 1, in per-vertex operations and primitive assembly 135, vertex data 131 are converted into primitives that are assembled to represent the surfaces to be graphically displayed. Some vertex data (for example, spatial coordinates) are transformed, typically using matrix multiplication, to project the spatial coordinates from a position in the three-dimensional world to a position on the display screen. In addition, advanced features are also performed in per-vertex operations and primitive assembly 135. Texturing coordinates may be generated and transformed. Lighting calculations are performed using the transformed vertex, the surface normal, material properties, and other lighting information to produce a color value. Perspective division, which is used to make distant objects appear smaller than closer objects in the display, also occurs in per-vertex operations and primitive assembly 135.

Rasterization 138 is the conversion of vertex data into "fragments." Each fragment corresponds to a single element (e.g., a "pixel") in the graphics display, and typically includes data defining color, shading, and texture. Per-fragment operations 139 consist of additional operations that may be enabled to enhance the detail of the fragments, such as blending, dithering and other like operations. After completion of these operations, the processing of the fragment is complete and it is written as a pixel to framebuffer 140.

Process 130 and other prior art computer graphics processes can be accomplished in software, in hardware (e.g., processors, integrated circuits, "chips," etc.), or in a combination of hardware and software. As hardware becomes more sophisticated and less expensive to produce, it is becoming more cost-beneficial to perform computer graphics processes (such as the rendering process) in hardware using specialized chips or collections of chips.

Hardware used for computer graphics is generally focused on a limited set of objects and object types, such as points, lines, triangles, and quadrangles ("quads"). In using these objects to render a scene, prior art graphics systems (such as the aforementioned OpenGL system) gain some efficiency by reusing vertices from one primitive to form a second, adjacent primitive. For example, three vertices can be used to form a first triangle primitive. A triangle primitive adjacent to the first one can be formed by reusing two of the vertices from the first triangle primitive and adding a new vertex. Similarly, a first quad primitive can be formed using four vertices, and a second quad primitive adjacent to the first can be formed by reusing two of the vertices from the first and adding two new vertices. These steps can be repeated to form triangle meshes, triangle strips, and triangle fans when adjacent triangles are present, and quad strips when adjacent quads are present.

Rendering using quadrangles can provide improvements in performance and efficiency relative to rendering that is limited to a single triangle at a time, because with a quadrangle more edges and vertices are processed per primitive. For example, with quad-based rendering, four vertices and four edges are processed per primitive, versus three vertices and three edges per primitive in triangle-based rendering. In the prior art, specialized chips that support quad-based rendering may be used to further improve processing performance and efficiency relative to those chips which are triangle-based. A quad-based rendering system using these specialized chips has the functionality to process objects other than quadrangles, such as triangles. However, as noted above, a prior art quad-based rendering system can still only process three vertices and three edges at a time when processing a non-quadrangle primitive.

Hence, a disadvantage to the prior art is that the performance capabilities of a quad-based rendering system are not fully realized when processing databases that are based on connected triangles, including triangle fans, strips and meshes. As scenes to be rendered get increasingly more complex and, correspondingly, the size of the triangle primitives gets smaller and smaller, the performance inefficiency associated with processing triangle objects in a quad-based rendering system becomes even more conspicuous.

Accordingly, what is needed is a method or system that can more efficiently process connected-triangle-based databases such as those used in computer graphics. In addition, what is needed is a method or system that accomplishes the above needs and can be used to enhance a quad-based rendering system. The present invention provides a novel solution to these needs. These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a method and system that can more efficiently process connected-triangle-based databases such as those used in computer graphics. In particular, the present invention provides a method and system that accomplish the above and can be used to enhance a quad-based rendering system.

In the present embodiment, the present invention pertains to a method and apparatus thereof for generating a computer graphics image using quadrangle-shaped primitives formed by combining connected triangle-shaped primitives (e.g., triangles connected in triangle strips, triangle fans or triangle meshes). In accordance with the present invention, a first triangle-shaped primitive and a second triangle-shaped primitive that are connected (that is, they share two vertices and a side) are optionally combined to form a quadrangle-shaped primitive. When the first and second triangle-shaped primitives are combined, the resultant quadrangle-shaped primitive is forwarded to a quad-based rasterization process (e.g., a rasterizer or rasterizer subsystem). Otherwise, the first triangle-shaped primitive is forwarded to the rasterization process. The second triangle-shaped primitive may also be forwarded to the rasterization process separate from the first, or it may be used to form a quadrangle in combination with another triangle primitive connected to it.

This treatment of combining triangle-shaped primitives to form quadrangle-shaped primitives allows a graphics subsystem to gain quad-based performance and efficiency for some applications without a quad-based database (e.g., with triangle strip, mesh or fan databases). In accordance with the present invention, a graphics subsystem could effectively double its throughput of connected triangle primitives by going from three vertices and three edges per primitive to four vertices and four edges per primitive.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "assembling" or "combining" or "forwarding" or "identifying" the like, refer to the action and processes of a computer system (e.g., process 300 of FIG. 3), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
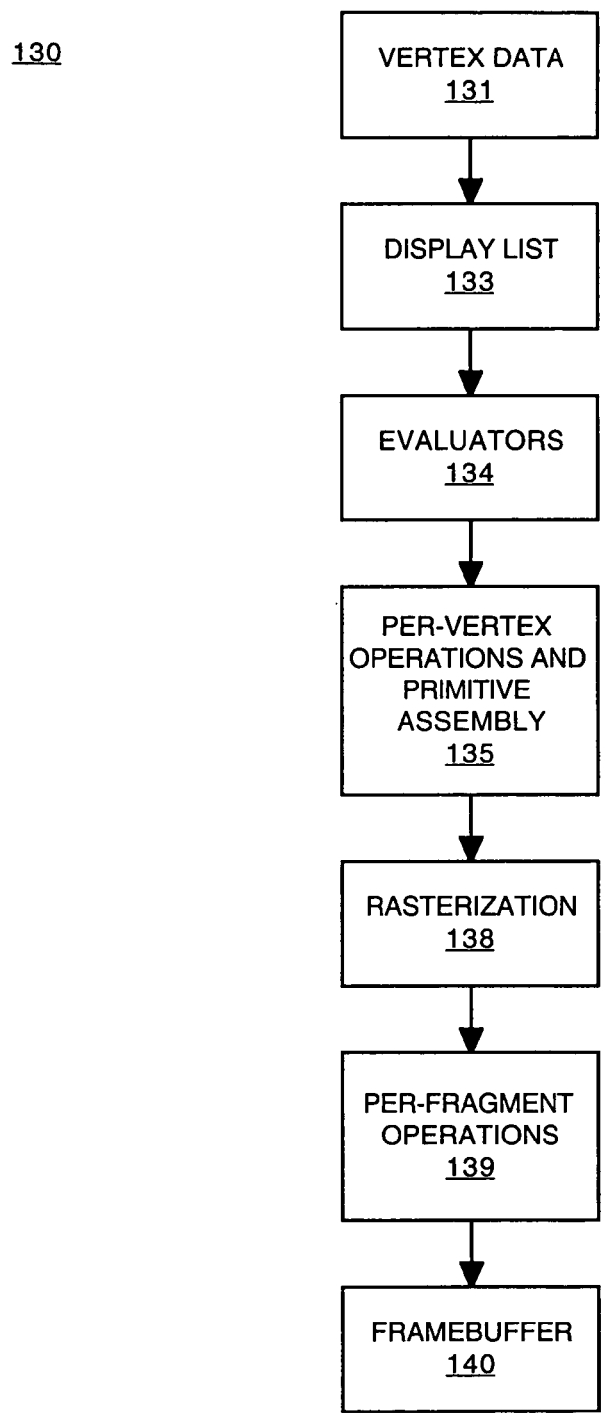
FIG. 1 is a block diagram of the steps in one embodiment of a computer graphics process.
Figure 2:
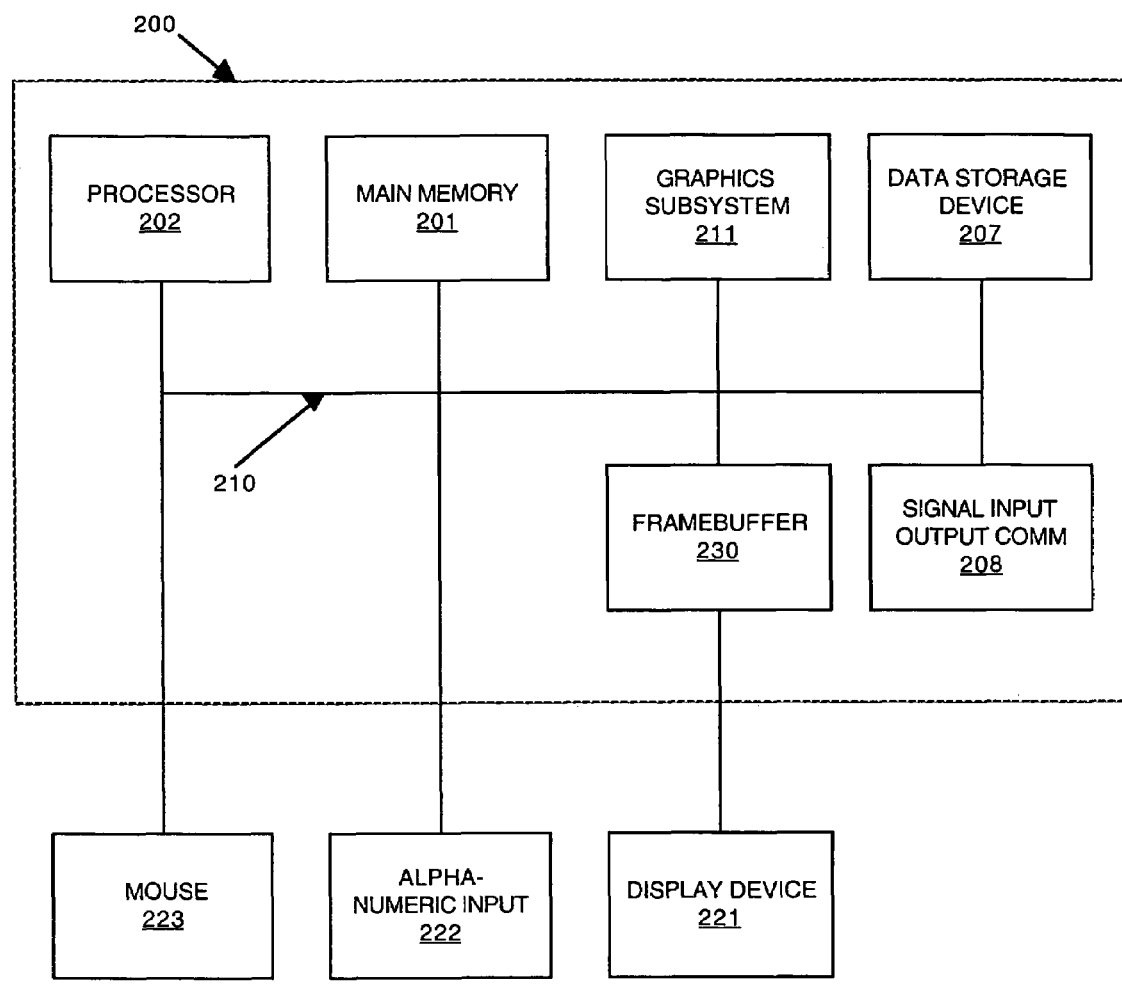
FIG. 2 is a block diagram of a general purpose computer system in accordance with one embodiment of the present invention.

FIG. 2 is a block diagram of graphics computer system 200 upon which the embodiments of the present invention can be implemented. Computer system 200 exemplifies a computer-controlled graphics systems for generating complex or three-dimensional images.

Computer system 200 comprises a bus or other communication means 210 for communicating information, and a processor 202 coupled with bus 210 for processing information. Computer system 200 further comprises a random access memory (RAM) or other dynamic storage device 201 (main memory 201) coupled to bus 210 for storing information and instructions to be executed by processor 202. Main memory 201 also may be used for storing temporary variables or other intermediate information during execution of instructions by processor 202. Data storage device 207 is coupled to bus 210 and is used for storing information and instructions. Furthermore, signal input/output (I/O) communication device 208 is used to couple computer system 200 onto, for example, a network.

Computer system 200 can also be coupled via bus 210 to an alphanumeric input device 222, including alphanumeric and other keys, which is used for communicating information and command selections to processor 202. Another type of user input device is mouse 223 (or a like device such as a trackball or cursor direction keys) which is used for communicating direction information and command selections to processor 202 and for controlling cursor movement on display device 221. This input device typically has two degrees of freedom in two axes, a first axis (e.g., x) and a second axis (e.g., y), which allows the device to specify positions in a plane.

In accordance with the present invention, also coupled to bus 210 is graphics subsystem 211. Processor 202 provides graphics subsystem 211 with graphics data such as drawing commands, coordinate vertex data, and other data related to an object's geometric position, color, and surface parameters. In general, graphics subsystem 211 processes the graphical data, converts the graphical data into a screen coordinate system, generates pixel data (e.g., color, shading, texture) based on the primitives (e.g., points, lines, and polygons including triangles and quadrangles, as well as polygon meshes, strips and the like), and performs blending, anti-aliasing, and other functions. The resulting data are stored in framebuffer 230. A display subsystem (not shown) reads framebuffer 230 and displays the image on display device 221.

Figure 3:
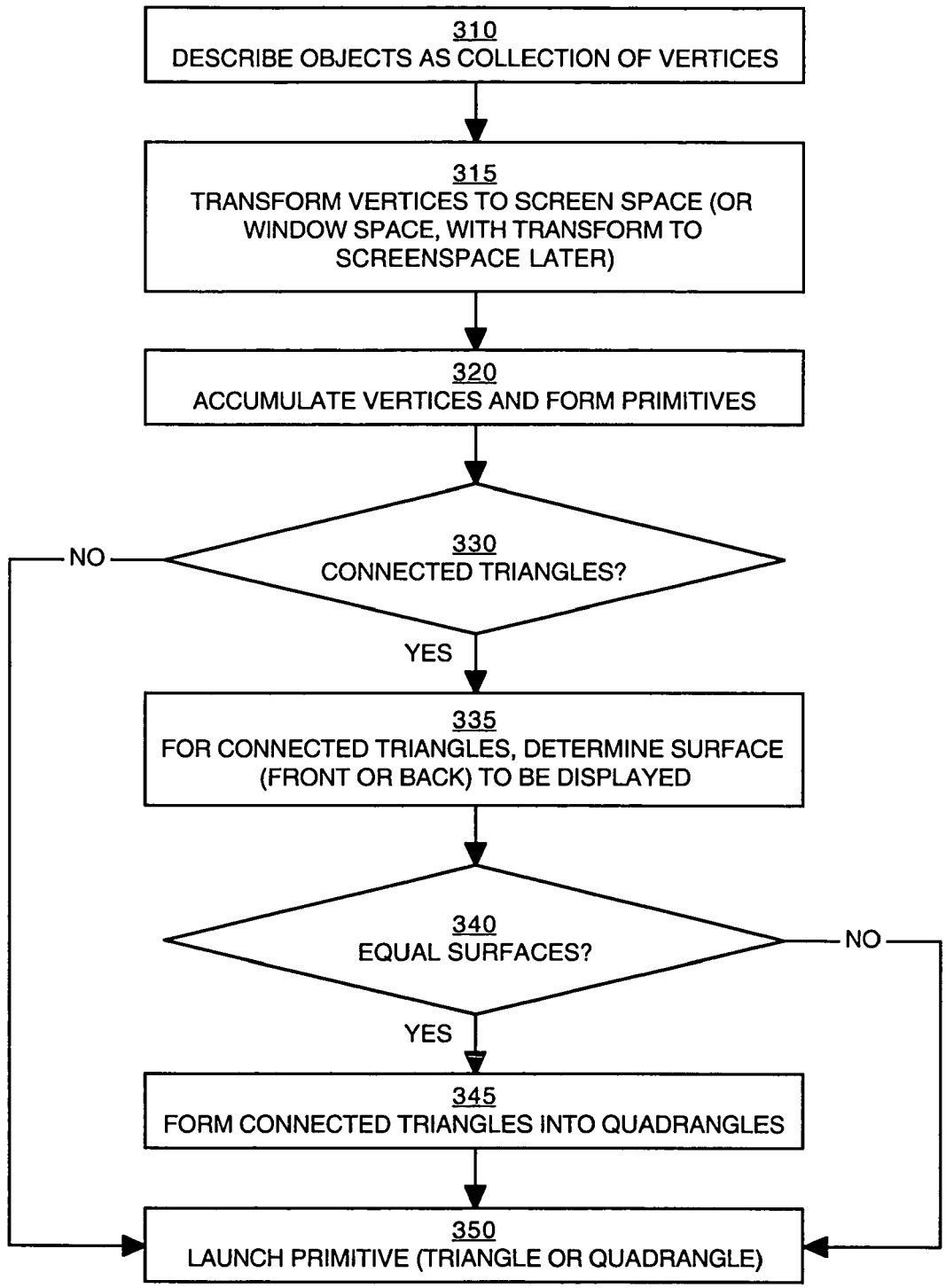
FIG. 3 is a flowchart of the steps in a process for generating a graphics image using a triangle-based database in a quad-based graphics system in accordance with one embodiment of the present invention.

FIG. 3 is a flowchart of the steps in a process 300 for generating a graphics image using a triangle-based database in a quad-based graphics system in accordance with one embodiment of the present invention. Process 300 can be implemented via computer-readable program instructions stored in a memory unit (e.g., main memory 201 and/or data storage device 207) and executed by processor 202 and graphics subsystem 211 of computer system 200 (FIG. 2). The present invention is described in a context wherein triangle primitives are opportunistically combined to form quadrangle primitives. However, it is appreciated that the method of the present invention can be extrapolated to other geometric shapes, including geometric shapes that may not be currently in use in the field of computer graphics.

In step 310, the objects to be used to render a scene are described as a collection of vertices. In the present embodiment, these objects can consist of points, lines, triangles (including triangle fans, meshes, and strips), and quadrangles (including quad strips). With regard to the present embodiment of the present invention, connected triangles (including triangle fans, meshes and strips) are of particular interest. The vertices can be represented using world coordinates (e.g., x, y, z, w) or surface normal coordinates (e.g., $n_x$, $n_y$, $n_z$). Triangle fans, meshes and strips and quad strips are known in the art.

In step 315, the vertices are transformed in order to project the objects from three-dimensional space into two-dimensional (screen) space. Alternatively, the vertices are represented in window space and transformed at a later time into screen space.

In step 320 of FIG. 3, the vertices are accumulated and used to form primitives. Graphics subsystem 211, using a known system of graphics instructions (such as OpenGL by Silicon Graphics, Inc., of Mountain View, Calif.), can be instructed to assemble a triangle primitive using a particular set of vertices. Accordingly, when these vertices are received by graphics subsystem 211, they are assembled into a primitive describing a triangle. Similarly, other vertices are subsequently received and used to form primitives, including additional triangle primitives.

Connected triangles are formed when two triangle primitives share a side (that is, they share two vertices). For example, graphics subsystem 211 receives three vertices and assembles them into a first triangle primitive. A fourth vertex is received by graphics subsystem 211 and paired with two of the vertices from the first triangle primitive to form a second triangle primitive. That is, two of the vertices previously received from the object database can be reused to form another triangle in combination with a new vertex.

Thus, triangles are individually formed, and so each triangle can be separately processed. Connected triangles can be combined into a set of primitives such as a triangle strip, a triangle fan, or a triangle mesh. As will be seen, in accordance with the present invention, connected triangles can be opportunistically combined to form quadrangles, and each quadrangle formed by pairing connected triangles can be processed at once as a single quadrangle (instead of consecutively as two triangles).

In step 330, if connected triangles (e.g., triangle fans, strips and meshes) are present, then process 300 proceeds to step 335; otherwise, process 300 proceeds directly to step 350.

In step 335, for connected triangles, the surface (front or back) that is to be displayed is identified for each triangle. This information is needed in order to determine whether one of the triangles folds over and obscures the other triangle or a portion thereof (see FIG. 4D). If the front face of one of the connected triangles is to be displayed, and the back face of the other of the connected triangles is to be displayed, this would indicate that one of the connected triangles is folded over and partially obscuring, or possibly entirely obscuring, the other triangle.

In step 340, if the surfaces to be displayed are determined to be equal for the connected triangles (that is, the same face of each of the connected triangles will be displayed), then process 300 proceeds to step 345. Otherwise, process 300 proceeds directly to step 350. Thus, if different surfaces are to be displayed, then the connected triangles are not opportunistically combined into quadrangles as described in step 345.

Figure 4A:
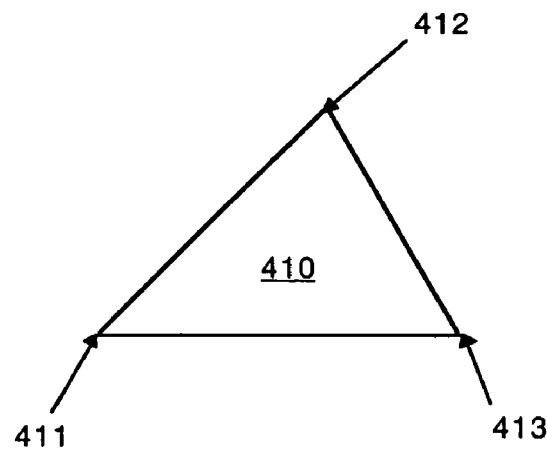
FIGS. 4A, 4B, 4C and 4D illustrate exemplary triangle primitives and quadrangle primitives in accordance with one embodiment of the present invention.
Figure 4B:
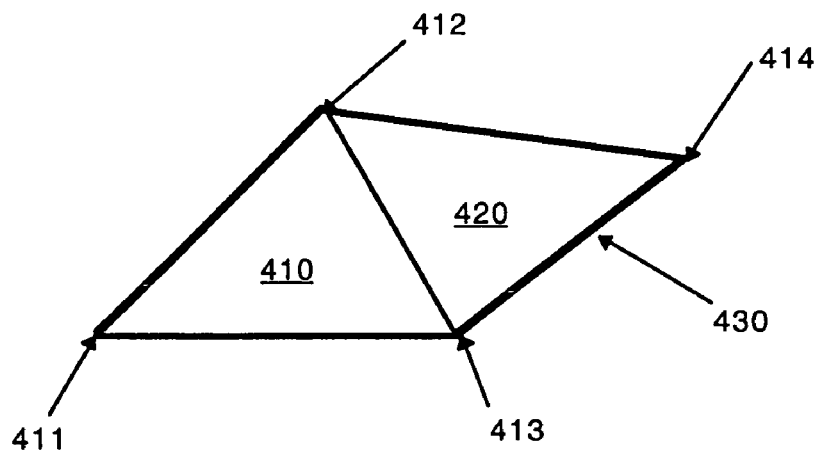

In step 345, if the same surface (front or back) of the connected triangles will be shown, the triangles may be combined (paired) to form a quadrangle (see FIG. 4B). However, in accordance with the present invention, connected triangles do not have to be paired and, under certain circumstances, will not be. For example, if the downstream portion of graphics subsystem 211 is idle or otherwise ready to process a triangle, a triangle can be launched immediately for subsequent processing. Also, in the case in which an odd number of triangle primitives is being used, it will be necessary to process at least one triangle individually.

Conversely, if the downstream portion of graphics subsystem 211 is busy or otherwise not ready to process a triangle, then that triangle may not be launched. In this case, connected triangles can be combined to form quadrangles in accordance with the present invention.

In step 350, the primitives (points, lines, triangles, quadrangles, etc.) formed in the preceding steps of process 300 are launched. Individual triangles can be individually launched. Similarly, connected triangles can be launched individually if they will be displaying different faces (e.g., one triangle partially overlaps or obscures the other triangle; see step 340). Connected triangles can also be launched individually if, as described above, the downstream portion of the graphics subsystem is idle or otherwise ready.

Connected triangles paired to form quadrangles (from step 345) can also be launched in step 350. In this latter case, the connected triangles are processed as a single quadrangle instead of as two triangles. Consequently, in accordance with the present invention, instead of processing three edges and three vertices twice (for a total of six edges and six vertices), only four edges and four vertices are processed. Thus, by combining two connected triangles to form a single quadrangle, the amount of processing can be reduced by up to one-half. Connected triangles can be processed with the efficiency of quadrangles without reformulating the triangle-based object database to a quad-based one. The present invention therefore more fully utilizes the capabilities of a quad-based rendering system when processing triangle-based databases, with resultant improvements in processing performance and efficiency. These improvements include, but are not limited to, locality of reference for texture, color and depth accesses to and from memory. Buffering and/or caching requirements for these data can be reduced.

In summary, in the present embodiment of the present invention, connected triangles (including triangle fans, meshes, and strips) can be opportunistically paired to form quadrangle primitives, which can be launched and processed as quadrangles (instead of as two triangles) in accordance with the present invention.

FIGS. 4A, 4B, 4C and 4D illustrate exemplary triangle primitives and quadrangle primitives in accordance with one embodiment of the present invention. FIG. 4A illustrates an exemplary triangle primitive 410 having vertices 411, 412 and 413.

FIG. 4B illustrates the case in which adjacent triangles are combined to form a quadrangle in accordance with the present invention. Triangle primitive 410 is formed first, with vertices 411, 412 and 413. A fourth vertex 414 is added, and a second triangle primitive 420 is formed by reusing vertices 412 and 413 with vertex 414. In the case in which triangle primitives 410 and 420 are combined, a quadrangle primitive 430 (with vertices 411, 412, 413 and 414) is formed. As described above in conjunction with FIG. 3, quadrangle primitive 430 is processed as a single entity in accordance with the present invention.

In the case in which adjacent triangles are paired to form a quadrangle, it may be necessary to indicate flat shading or flat lighting of the resultant quadrangle in a manner different than that used for a case of a quadrangle-based display list. In the present embodiment, flat shading or flat lighting attributes are associated with the third and fourth vertices of the formed quadrangle (e.g., vertices 413 and 414 of quadrangle 430). Vertex 413 is thus used for flat shading or lighting for triangle primitive 410, and vertex 414 is used for the same for triangle primitive 420. In contrast, an OpenGL-compliant quad or quad strip database relies solely on the attributes of the final vertex of each quad, for flat shading and/or lighting. It is appreciated that, in other embodiments, different techniques may be used to indicate flat shading and lighting, and other characteristics may differentiate the treatment of quads versus paired triangles.

Figure 4C:
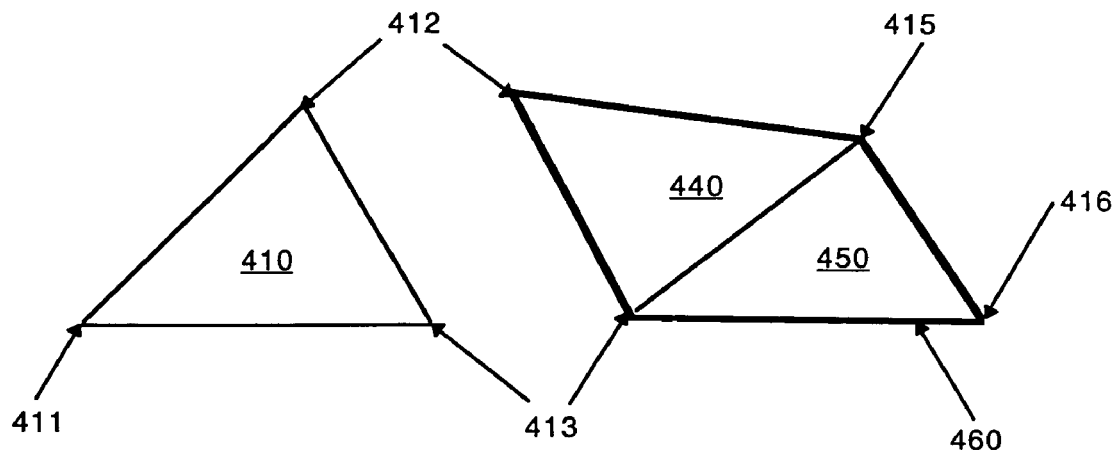

FIG. 4C illustrates the case in which two adjacent triangles (410 and 440) are not combined in accordance with the present invention. Triangle primitive 410 is formed first, with vertices 411, 412 and 413. A fourth vertex 415 is added, and a second triangle primitive 440 is formed by reusing vertices 412 and 413 with vertex 415. However, although adjacent, triangle primitives 410 and 440 are not combined. As explained above, for various reasons triangle primitive 410 may be processed individually, separately from triangle primitive 440. Subsequently, a fifth vertex 416 is added, and a third triangle primitive 450 is formed by reusing vertices 413 and 415 with vertex 416. In the case in which triangle primitives 440 and 450 are combined in accordance with the present invention, a quadrangle primitive 460 (with vertices 412, 413, 415 and 416) is formed. As described in conjunction with FIG. 3, quadrangle primitive 460 is processed as a single entity in accordance with the present invention.

Figure 4D:
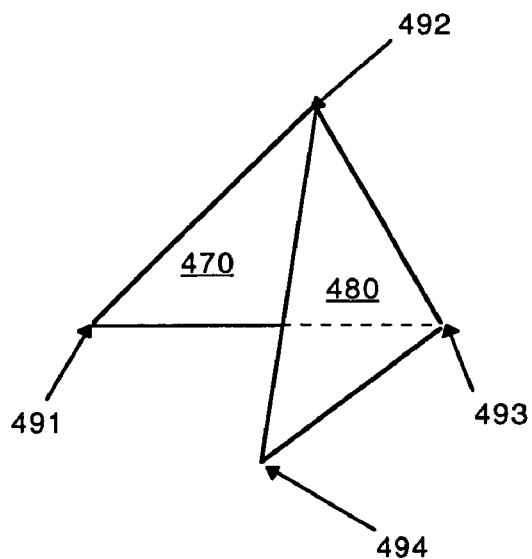

FIG. 4D illustrates the case in which adjacent triangles overlap. Triangle primitive 470 is formed first, with vertices 491, 492 and 493. A fourth vertex 494 is added, and a second triangle primitive 480 is formed by reusing vertices 492 and 493 with vertex 494. However, in this case, the front surface of triangle primitive 470 will be displayed, the back surface of triangle primitive 480 will be displayed, and triangle primitive 480 partially obscures triangle primitive 470. Thus, in the present embodiment, adjacent triangle primitives 470 and 480 would not be combined to form a quadrangle. The two triangle primitives 470 and 480 would be processed individually and in order, so that triangle primitive 480 would correctly obscure triangle primitive 470.

In another embodiment, triangle primitives 470 and 480 can be rendered at the same time. In that embodiment, one triangle primitive (e.g., 480) is given priority over the other (e.g., 470) so that they will be correctly displayed, with triangle primitive 480 partly obscuring triangle primitive 470.

In summary, the present invention provides a method and system that can more efficiently process connected-triangle-based databases such as those used in computer graphics. In particular, the present invention provides a method and system that can be used to enhance a quad-based rendering system.

The present invention opportunistically combines connected triangle primitives (including triangle fans, meshes, and strips) to form a quadrangle primitive. The quadrangle primitive can be launched and processed instead of consecutively launching and processing individual triangle primitives.

Consequently, in the case of two connected triangles, instead of processing three edges and three vertices twice (for a total of six edges and six vertices), only four edges and four vertices are processed. Thus, by processing connected triangles as a quadrangle in accordance with the present invention, the amount of primitives can be reduced by up to one-half. Connected triangles can be processed with the efficiency of quadrangles without reformulating the triangle-based object database to a quad-based one. The present invention therefore more fully utilizes the capabilities of a quad-based rendering system when processing connectedtriangle-based databases, with resultant improvements in processing performance and efficiency.

The preferred embodiment of the present invention, method and apparatus for rendering a quadrangle primitive, is thus described. While the present invention has been described in particular embodiments, it should be appreciated that the present invention should not be construed as limited by such embodiments, but rather construed according to the following claims.

What is claimed is:

1. A method for generating a computer graphics image, said method comprising the steps of:
   a) receiving a set of connected primitives comprising a first primitive and a second primitive each having a first geometric shape, wherein said first primitive and said second primitive share a side;
   b) identifying a respective surface of each of said first primitive and said second primitive to be displayed in said computer graphics image;
   c) if the respective surfaces are the same, combining said first primitive and said second primitive to form a third primitive having a second geometric shape; and
   d) forwarding said third primitive to a rasterization process for generating said computer graphics image when said first primitive and said second primitive are combines, and otherwise forwarding said first primitive and said second primitive to said rasterization process.

2. The method for generating a computer graphics image as recited in claim 1 wherein said first geometric shape is a triangle and said set of connected primitives comprises a triangle strip.

3. The method for generating a computer graphics image as recited in claim 1 wherein said first geometric shape is a triangle and said set of connected primitives comprises a triangle fan.

4. The method for generating a computer graphics image as recited in claim 1 wherein said first geometric shape is a triangle and said set of connected primitives comprises a triangle mesh.

5. The method for generating a computer graphics image as recited in claim 1 wherein said second geometric shape is a quadrangle.

6. The method for generating a computer graphics image as recited in claim 1, wherein said first primitive and said second primitive are assembled from vertices in a computer graphics image, said vertices described by coordinates identified in vertex data.

7. The method for generating a computer graphics image as recited in claim 6 wherein said vertex data further comprises color and shading information.

8. The method for generating a computer graphics image as recited in claim 6 wherein said coordinates are world coordinates.

9. The method for generating a computer graphics image as recited in claim 6 wherein said coordinates are surface normal coordinates.

10. A method for generating a computer graphics image, said method comprising the steps of
    a) receiving vertex data comprising coordinates described in a computer graphics image;
    b) assembling said vertices into a first primitive having a first geometric shape;
    c) assembling one or more vertices adjacent to said first primitive into a second primitive having said first geometric shape, said second primitive sharing one or more vertices with said first primitive;
    d) identifying a respective surface of each of said first primitive and said second primitive to be displayed in said computer graphics image; and
    e) if the respective surfaces are the same, combining said first primitive and said second primitive to form a third primitive having a second geometric shape.

11. The method for generating a computer graphics image as recited in claim 10 further comprising the step of:
    e) forwarding said third primitive to a rasterization process for generating said computer graphics image when said first primitive and said second primitive are combined, and otherwise forwarding said first said first primitive to said rasterization process.

12. The method for generating a computer graphics image as recited in claim 10 further comprising the steps of, when only said first primitive is forwarded to said rasterization process in said step e):
    f) assembling one of one or more vertices adjacent to said second primitive into a fourth primitive having said first geometric shape, said fourth primitive sharing one or more vertices with said second primitive;
    g) combining said second primitive and said fourth primitive to form a fifth primitive having said second geometric shape; and
    h) forwarding said fifth primitive to said rasterization process.

13. The method for generating a computer graphics image as recited in claim 12 wherein said first geometric shape is a triangle and said second geometric shape is a quadrangle.

14. The method for generating a computer graphics image as recited in claim 12 further comprising the steps of:
    i) assembling primitives received by said rasterization process into fragments; and
    j) storing said fragments as pixels in a framebuffer.

15. The method for generating a computer graphics image as recited in claim 10 wherein said vertex data further comprises color and shading information.

16. The method for generating a computer graphics image as recited in claim 10 wherein said coordinates are world coordinates.

17. The method for generating a computer graphics image as recited in claim 10 wherein said coordinates are surface normal coordinates.

18. A computer system comprising:
    a bus;
    a processor coupled to said bus;
    a computer readable memory unit coupled to said bus;
    said processor performing a method for generating a computer graphics image, said method comprising the steps of
    a) receiving vertex data comprising coordinates described in a computer graphics image;
    b) assembling said vertices into a first primitive having a first geometric shape;
    c) assembling one or more vertices adjacent to said first primitive into a second primitive having said first geometric shape, said second primitive sharing one or more vertices with said first primitive;
    d) identifying a respective surface of each of said first primitive and said second primitive to be displayed in said computer graphics image;
    e) if the respective surfaces are the same, combining said first primitive and said second primitive to form a third primitive having a second geometric shape; and f) forwarding said third primitive to a rasterization process for generating said computer graphics image when said first primitive and said second primitive are combines, and otherwise forwarding said first primitive to said rasterization process.

19. The computer system of claim 18 wherein said method further comprises the steps of:
  f) assembling one of one or more vertices adjacent to said second primitive into a fourth primitive having said first geometric shape, said fourth primitive sharing one or more vertices with said second primitive;
  g) combining said second primitive and said fourth primitive to form a fifth primitive having said second geometric shape; and
  h) forwarding said fifth primitive to said rasterization process.

20. The computer system of claim 19 wherein said first geometric shape is a triangle and said second geometric shape is a quadrangle.

21. The computer system of claim 18 wherein said vertex data further comprises color and shading information.

22. The computer system of claim 18 wherein said coordinates are world coordinates.

23. The computer system of claim 18 wherein said coordinates are surface normal coordinates.

\* \* \* \* \*